US011199439B2

(12) United States Patent
Nakata

(10) Patent No.: US 11,199,439 B2
(45) Date of Patent: Dec. 14, 2021

(54) PHOTODETECTOR DEVICE AND OPTICAL ENCODER DEVICE

(71) Applicant: CANON KABUSHIKI KAISHA, Tokyo (JP)

(72) Inventor: Yasushi Nakata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/808,647

(22) Filed: Mar. 4, 2020

(65) Prior Publication Data

US 2020/0292378 A1  Sep. 17, 2020

(30) Foreign Application Priority Data

Mar. 12, 2019 (JP) .............................. JP2019-045068

(51) Int. Cl.
*G01J 1/02* (2006.01)
*G01J 1/42* (2006.01)
*G01J 1/44* (2006.01)

(52) U.S. Cl.
CPC ........... *G01J 1/0266* (2013.01); *G01J 1/4228* (2013.01); *G01J 1/44* (2013.01); *G01J 2001/444* (2013.01)

(58) Field of Classification Search
CPC .......... G01J 1/0266; G01J 1/4228; G01J 1/44; G01J 2001/444; G01J 2001/446; G01J 1/46; G01D 5/347; G01D 5/34
See application file for complete search history.

(56) References Cited

U.S. PATENT DOCUMENTS

2011/0114829 A1* 5/2011 Lee ....................... H03M 1/206
                                                  250/231.13
2013/0292558 A1* 11/2013 Horiguchi .......... G01D 5/34715
                                                  250/231.1

FOREIGN PATENT DOCUMENTS

JP       2005-265512       9/2005

* cited by examiner

*Primary Examiner* — Thanh Luu
*Assistant Examiner* — Monica T Taba
(74) *Attorney, Agent, or Firm* — Venable LLP

(57) ABSTRACT

A photodetector device and an optical encoder device that can suppress level variation of a detection signal are provided. A photodetector device of one embodiment includes: a light receiving unit including a plurality of photoelectric conversion elements; a selector circuit that selects a first photoelectric conversion element group and a second photoelectric conversion element group, in the light receiving unit; a differential amplifier that outputs a detection signal in accordance with a difference between a first output signal of the first photoelectric conversion element group and a second output signal of the second photoelectric conversion element group; and a correction unit that corrects the detection signal based on the first output signal and the second output signal.

17 Claims, 13 Drawing Sheets

PHOTODETECTOR DEVICE AND OPTICAL ENCODER DEVICE

BACKGROUND OF THE INVENTION

Field of the Invention

The present invention relates to a photodetector device and an optical encoder device.

Description of the Related Art

An optical encoder device includes a photodetector device that detects a reflected light from a scale and outputs a detection signal based on the reflected light. The optical encoder device can further use a detection signal from the photodetector device to perform position detection of the scale. When the level of a detection signal from the photodetector device varies and the detection signal becomes unstable, position accuracy may decrease. An optical encoder device disclosed in Japanese Patent Application Laid-Open No. 2005-265512 controls a light source so that the light amount at a light receiving unit becomes constant and obtains a stable detection signal.

SUMMARY OF THE INVENTION

When a stray light other than a reflected light from a scale enters a light receiving unit, the device in Japanese Patent Application Laid-Open No. 2005-265512 is unable to obtain a stable detection signal.

The present disclosure intends to provide a photodetector device and an optical encoder device that can obtain a stable detection signal even when a stray light enters a light receiving unit.

A photodetector device of one embodiment of the present disclosure includes: a light receiving unit including a plurality of photoelectric conversion elements; a selector circuit that selects a first photoelectric conversion element group and a second photoelectric conversion element group, respectively, in the light receiving unit; a differential amplifier that outputs a detection signal in accordance with a difference between a first output signal of the first photoelectric conversion element group and a second output signal of the second photoelectric conversion element group; and a correction unit that corrects the detection signal based on the first output signal and the second output signal.

According to the present disclosure, a stable detection signal can be obtained even when a stray light enters a light receiving unit.

Further features of the present invention will become apparent from the following description of exemplary embodiments with reference to the attached drawings.

DESCRIPTION OF THE EMBODIMENTS

Embodiments will be described below with reference to the drawings.

First Embodiment

Figure 1:
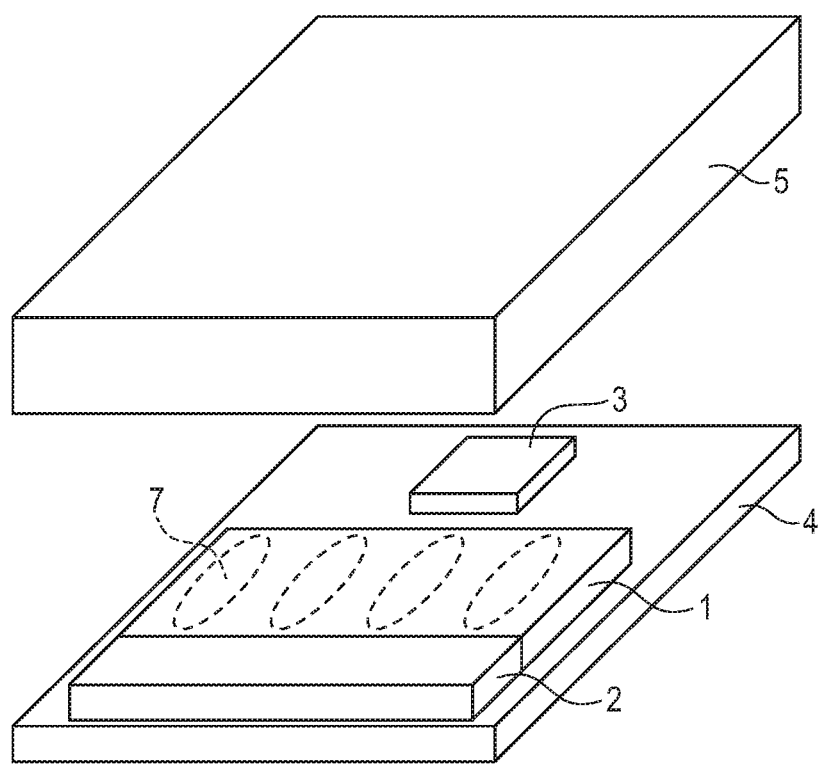
FIG. 1 is a perspective view of a photodetector device of a first embodiment.
Figure 2:
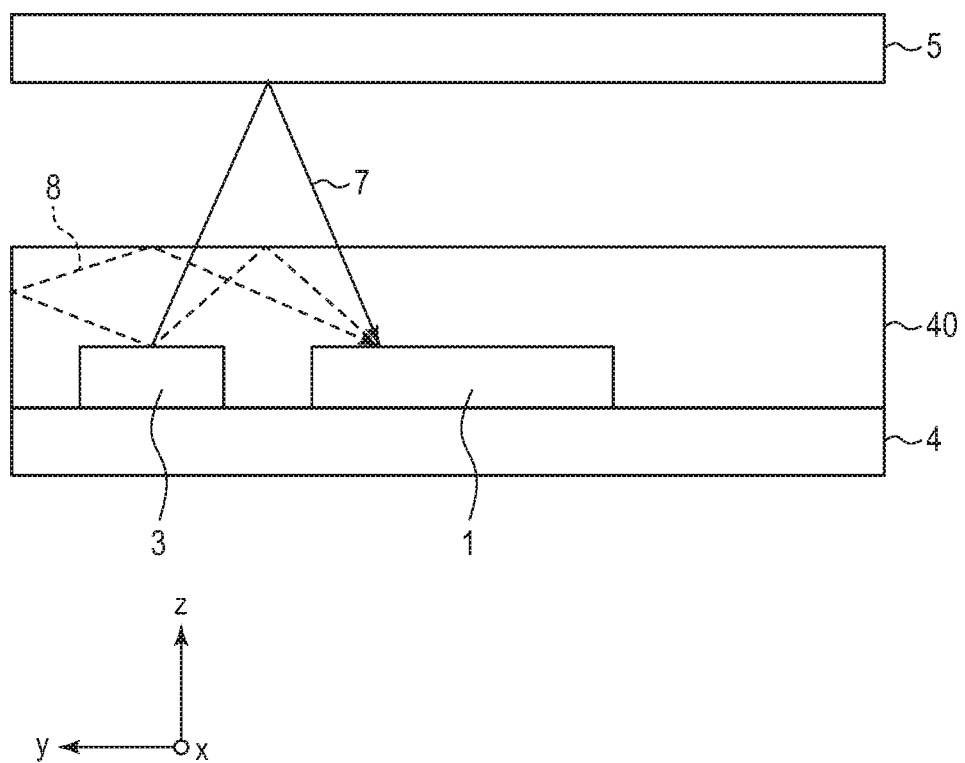
FIG. 2 is a side view of the photodetector device of the first embodiment.

FIG. 1 and FIG. 2 are external views of a photodetector device of the present embodiment. FIG. 1 is a perspective view of the photodetector device of the present embodiment, and FIG. 2 is a side view of the photodetector device of the present embodiment.

The photodetector device in the present embodiment is applicable to an optical encoder device, for example, includes a light receiving unit 1, a signal processing unit 2, a light source 3, and a substrate 4 and can detect a reflected light from a scale 5. The light receiving unit 1, the signal processing unit 2, and the light source 3 are mounted on the upper face in the z direction of the substrate 4 and formed inside a package 40 such as a transparent resin.

The light source 3 is formed of a light emitting diode, for example, and emits a light to the scale 5. The scale 5 is provided to face the substrate 4 and is configured to be relatively movable in the x direction with respect to the substrate 4. The scale 5 has a predetermined pattern in which reflection portions and non-reflection portions are repeated, and the reflection portions may be formed of a metal film or the like formed on a glass substrate, for example. A plurality of reflection portions are arranged at a certain cycle in the x direction to form a scale track. Note that multiple lines of scale tracks may be formed, and multiple lines of scale tracks may have reflection portions arranged in different cycles, respectively.

The light receiving unit 1 has a plurality of photodiodes (photoelectric conversion elements), and the plurality of photodiodes are arranged at a certain cycle in the x direction. The light receiving unit 1 is irradiated with a reflected light 7 from the scale 5. The luminance distribution (brightness and darkness) of the reflected light 7 at the light receiving unit 1 corresponds to the pattern of the scale 5. When the scale 5 moves in the x direction, the luminance distribution of the reflected light 7 at the light receiving unit 1 also moves in the x direction, and the signal of a photodiode of the light receiving unit 1 repeatedly changes.

The signal processing unit 2 includes an amplifier circuit, a comparator circuit, or the like and processes a signal output from the light receiving unit 1 to output a detection signal in accordance with the position of the scale 5. The detection signal changes in accordance with the position of the scale 5 and can be used as an encoder signal. That is, when the photodetector device of the present embodiment is applied to an optical encoder device, position detection is enabled.

In addition to the reflected light 7 from the scale 5, a stray light 8 reflected by the package 40 may reach the light receiving unit 1, for example. As described later, the photodetector device of the present embodiment can obtain a stable detection signal even when the stray light 8 enters the light receiving unit 1, and this enables accurate position detection.

Furthermore, in the photodetector device in the present embodiment, the light receiving unit 1, the signal processing unit 2, and the light source 3 are provided on the common substrate 4. In such a way, the light receiving unit 1, the signal processing unit 2, and the light source 3 are formed in a single package, and thereby the relative position of the light receiving unit 1 and the light source 3 can be determined at high accuracy, which enables accurate position detection.

Figure 3:
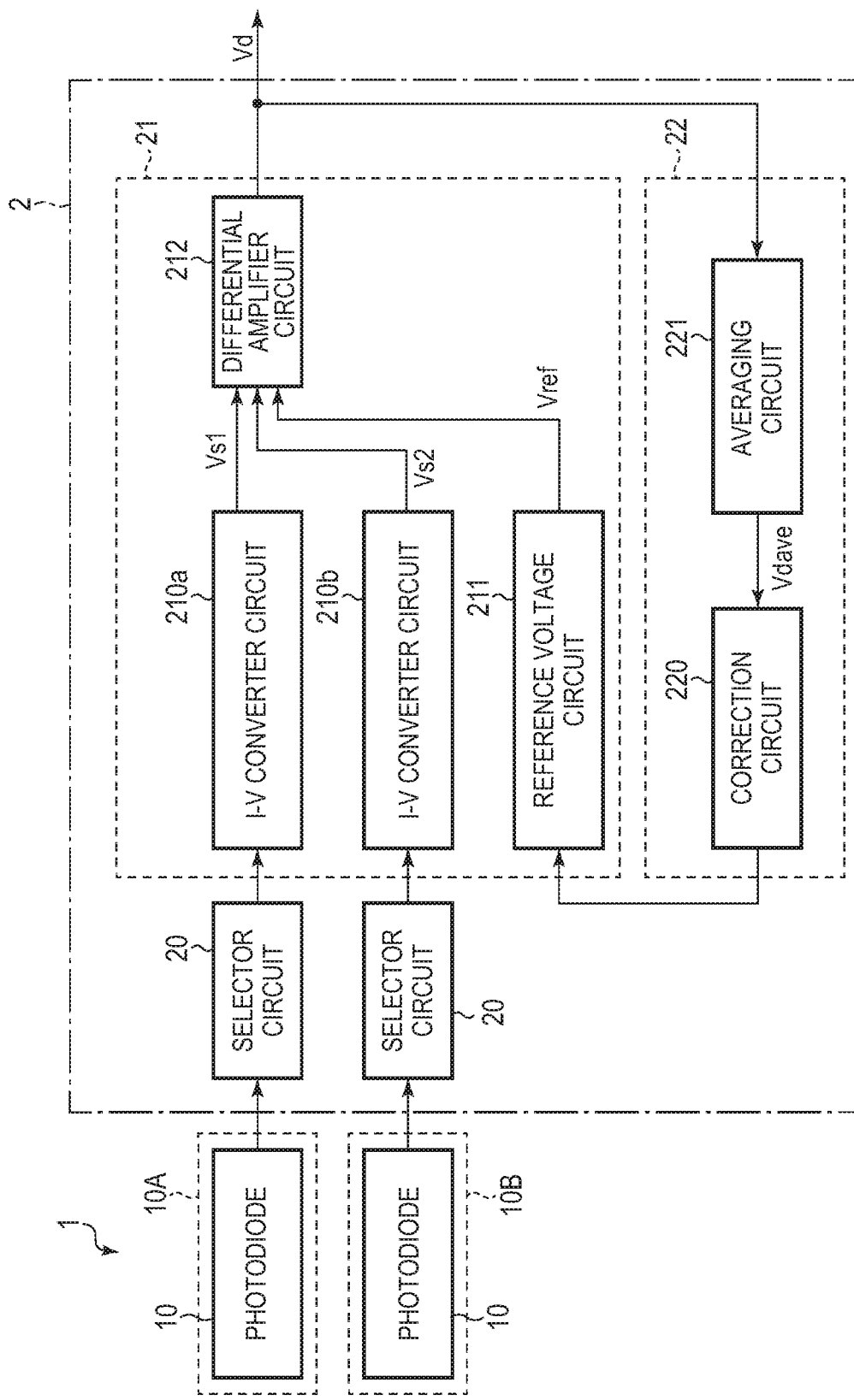
FIG. 3 is a block diagram of a light receiving unit and a signal processing unit of the first embodiment.

FIG. 3 is a block diagram of the light receiving unit and the signal processing unit of the present embodiment. The signal processing unit 2 includes selector circuits 20, a detection signal generation unit 21, and a correction unit 22.

The selector circuit 20 selects a first photodiode group 10A or a second photodiode group 10B, which are photoelectric conversion element groups, in the light receiving unit 1. The first photodiode group 10A includes one or a plurality of photodiodes 10, and the second photodiode group 10B includes one or a plurality of photodiodes 10.

The detection signal generation unit 21 further includes current-to-voltage conversion amplifiers (hereafter, referred to as "I-V converter circuit") 210a and 210b, a reference voltage circuit 211, and a differential amplifier circuit 212. The I-V converter circuit 210a converts a current of the photodiode 10 in the first photodiode group 10A into a voltage to generate an output signal Vs1. Similarly, the I-V converter circuit 210b converts a current of the photodiode 10 in the second photodiode group 10B into a voltage to generate an output signal Vs2.

The reference voltage circuit 211 includes a voltage divider circuit, a voltage follower circuit, and the like and outputs a reference voltage Vref. The differential amplifier circuit 212 includes an operational amplifier, the output signal Vs1 is input to the first input terminal of the differential amplifier circuit 212, and the output signal Vs2 is input to the second input terminal. The differential amplifier circuit 212 is further supplied with the reference voltage Vref as a bias voltage and generates a detection signal Vd that changes based on the reference voltage Vref as a reference. The detection signal Vd is expressed by the following equation, where the amplification factor of the differential amplifier circuit 212 is denoted as "A".

$$Vd = (Vs1 - Vs2) \times A \quad \text{(Equation 1)}$$

The correction unit 22 includes a correction circuit 220 and an averaging circuit 221 and generates a correction value Voff based on the output signals Vs1 and Vs2. The averaging circuit 221 uses the maximum voltage Vdmax and the minimum voltage Vdmin of the detection signal Vd to generate an average voltage Vdave of the detection signal Vd. The average voltage Vdave is expressed by the following equation.

$$Vdave = (Vdmax + Vdmin)/2 \quad \text{(Equation 2)}$$

The correction circuit 220 generates the correction value Voff based on the average voltage Vdave. The correction value Voff is fed back to the reference voltage circuit 211.

The relationship between the correction value Voff and reference voltages Vref1 and Vref2 is as follows, where a reference voltage to be corrected is denoted as "Vref1" and a corrected reference voltage is denoted as "Vref2".

$$Voff = Vdave - Vref1 \quad \text{(Equation 3)}$$

$$Vref2 = Vref1 - Voff \quad \text{(Equation 4)}$$

Since the detection signal Vd is a signal in accordance with a difference between the output signals Vs1 and Vs2, the correction value Voff obtained from the detection signal Vd is also a signal based on the difference between the output signals Vs1 and Vs2. The reference voltage circuit 211 changes the reference voltage Vref based on the output signals Vs1 and Vs2 and thereby corrects the detection signal Vd.

Figure 4:
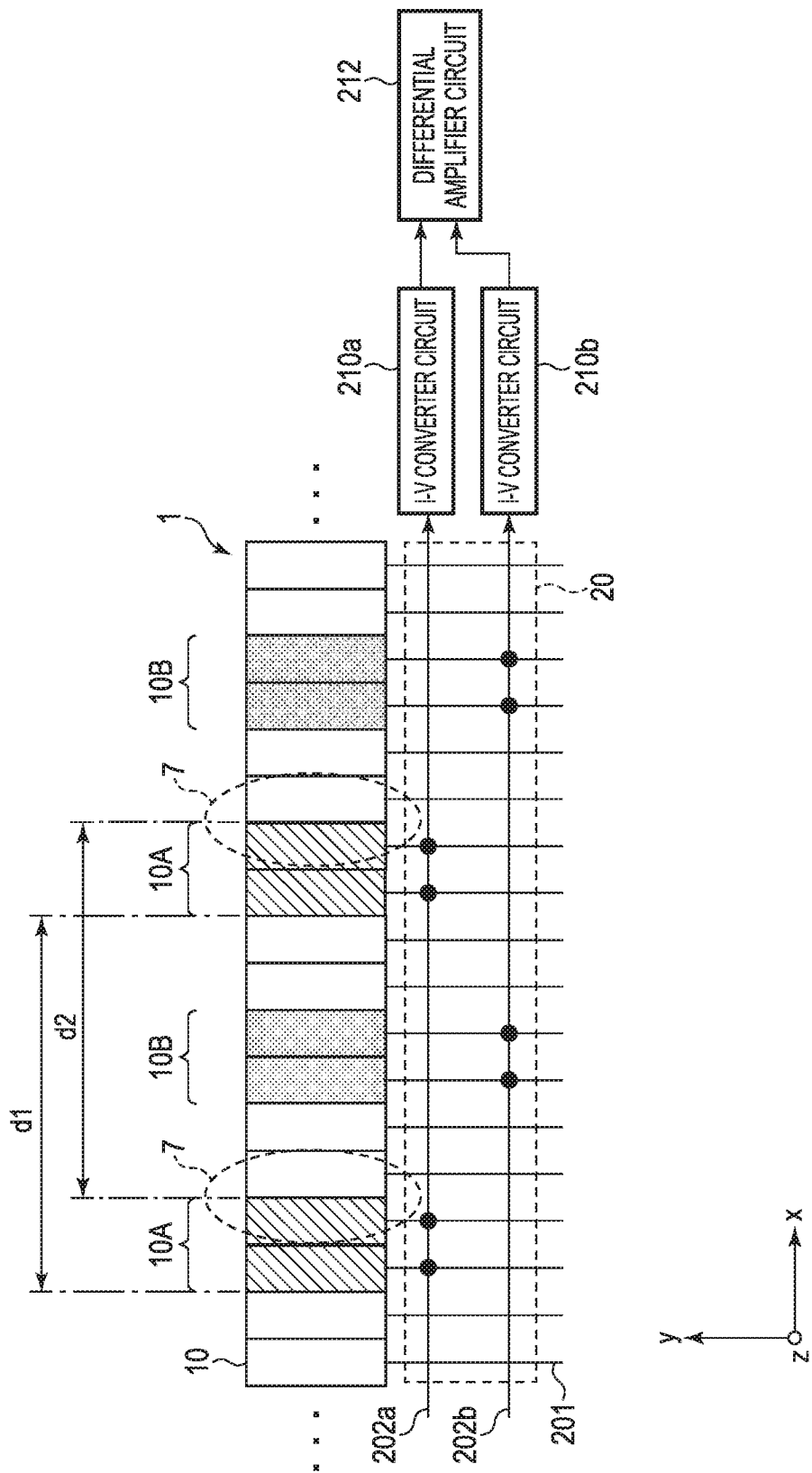
FIG. 4 is a diagram illustrating the light receiving unit and a selector circuit of the first embodiment.

FIG. 4 is a diagram illustrating the light receiving unit 1 and the selector circuit 20 of the present embodiment. As described above, the plurality of photodiodes 10 of the light receiving unit 1 are aligned in the x direction. The selector circuit 20 includes a matrix circuit, and the matrix circuit connects or disconnects a plurality of wirings 201, which are connected to the photodiodes 10, to or from wirings 202a and 202b intersecting the plurality of wirings 201. The wiring 202a is connected to the first photodiode group 10A, and the wiring 202b is connected to the second photodiode group 10B. The selector circuit 20 can cause any wiring 201 to be connected to any of the wirings 202a and 202b and select the first photodiode group 10A or the second photodiode group 10B as appropriate. In such a way, the current signal of the first photodiode group 10A is output to the I-V converter circuit 210a via the wiring 202a, and the current signal of the second photodiode group 10B is output to the I-V converter circuit 210b via the wiring 202b.

In FIG. 4, the first photodiode group 10A is selected in a cycle of every distance d1 in the x direction. The second photodiode group 10B is similarly selected in a cycle of every distance d1 in the x direction. However, the second photodiode group 10B is located between the first photodiode groups 10A, and the phase of the alignment cycle of the second photodiode groups 10B is opposite to the phase of the alignment cycle of the first photodiode groups 10A. Thereby, the output signals Vs1 and Vs2 change with time in a complementary manner.

The reflected light 7 is emitted to the light receiving unit 1 in a cycle of every distance d2 in the x direction. Here, the distance d2 corresponds to the distance between reflection portions of the scale 5. To efficiently detect the reflected light 7, it is desirable that the distance d2 between the reflection portions of the scale 5 be the same as the distance d1 of each of the photodiode groups 10A and 10B. Further, to have symmetrical waveforms of the output signals Vs1 and Vs2, it is desirable that the first photodiode group 10A and the second photodiode group 10B include the same number of photodiodes 10, respectively. Note that the distances d1 and d2 and the number of photodiodes 10 of the photodiode groups 10A and 10B are not necessarily limited to the example described above. Further, any shape of the photodiode 10 may be defined.

Figure 5:
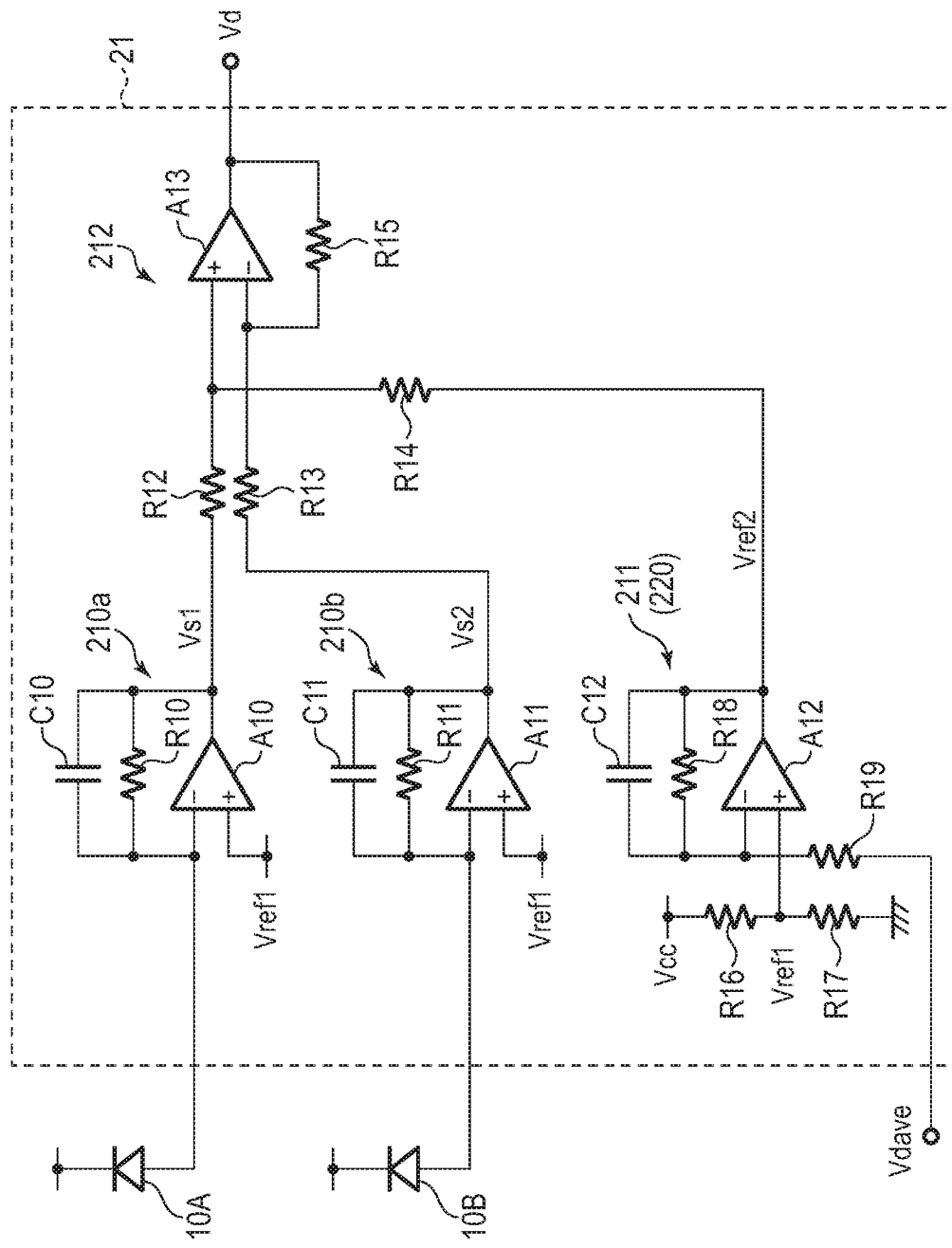
FIG. 5 is a circuit example of a detection signal generation unit of the first embodiment.

FIG. 5 is a circuit example of the detection signal generation unit 21 of the present embodiment. As described above, the detection signal generation unit 21 includes the I-V converter circuits 210a and 210b, the reference voltage circuit 211, and the differential amplifier circuit 212.

The I-V converter circuit 210a includes a differential amplifier A10, a resistor R10, and a capacitor C10. The inverting input terminal of the differential amplifier A10 is connected to the anodes of the plurality of photodiodes 10 forming the first photodiode group 10A, and a reference voltage Vref1 is applied to the non-inverting input terminal of the differential amplifier A10. The resistor R10 and the capacitor C10 are connected in parallel between the inverting input terminal and the output terminal of the differential amplifier A10. The differential amplifier A10 forms a current-to-voltage circuit and converts the current of the photodiodes 10 into a voltage to generate the output signal Vs1. Similarly, the I-V converter circuit 210b includes a differential amplifier A11, a resistor R11, and a capacitor C11 and converts the current of the plurality of photodiodes 10 forming the second photodiode group 10B into a voltage to generate the output signal Vs2. Note that, since the I-V converter circuits 210a and 210b in FIG. 5 form an inverting amplifier circuit, the voltages of the output signals Vs1 and Vs2 decrease with respect to the reference voltage Vref1 as the current of the photodiodes 10 increases. In the following description, for simplified illustration, each amplitude of the output signals Vs1 and Vs2 may be represented as a positive voltage change.

The reference voltage circuit 211 includes a differential amplifier A12, resistors R16, R17, R18, and R19, and a capacitor C12. The reference voltage circuit 211 in FIG. 5 also functions as the correction circuit 220. The resistors R16 and R17 divide the voltage between the power source voltage (first power source voltage) Vcc and the ground voltage (second power source voltage) to generate the reference voltage Vref1. It is desirable that the resistors R16 and R17 have the same value and the reference voltage Vref1 be an intermediate voltage Vcc/2 between the power source voltage Vcc and the ground voltage. The reference voltage Vref1 is applied to the non-inverting input terminal of the differential amplifier A12. Furthermore, the reference voltage Vref1 is applied to non-inverting input terminals of the differential amplifiers A10 and A11 of the I-V converter circuits 210a and 210b. When the reference voltage Vref1 is Vcc/2, the dynamic range of the output signals Vs1 and Vs2 and the detection signal Vd can be maximized. The resistor R18 and the capacitor C12 are connected in parallel between the inverting input terminal and the output terminal of the differential amplifier A12 of the reference voltage circuit 211. Further, the average voltage Vdave from the correction unit 22 is applied to the inverting input terminal of the differential amplifier A12 via the resistor R19 as an offset voltage. The differential amplifier A12 generates the reference voltage Vref2 obtained by correcting the reference voltage Vref1 by using the correction value Voff. By selecting the values of the capacitor C12 and the resistor R18 as appropriate, it is possible to set a gain and a time constant of the feedback loop. For example, to increase the response of the reference voltage Vref to the correction value Voff, the value of the capacitor C12 may be reduced.

The differential amplifier circuit 212 includes a differential amplifier A13 and resistors R12, R13, R14, and R15. The output signal Vs1 is input to the non-inverting input terminal of the differential amplifier A13 via the resistor R12, and the output signal Vs2 is input to the inverting input terminal via the resistor R13. The resistor R15 is connected between the inverting input terminal and the output terminal of the differential amplifier A13, a signal based on the difference between the output signal Vs1 and the output signal Vs2 is amplified to output the detection signal Vd. The differential amplifier A13 is driven on the power source voltage Vcc and the ground voltage, the detection signal Vd may have a dynamic range from the ground voltage to the power source voltage Vcc. The corrected reference voltage Vref2 is applied to the non-inverting input terminal of the differential amplifier A13 via the resistor R14 as an offset voltage. Thereby, the differential amplifier A13 can output the corrected detection signal Vd.

Figure 6:
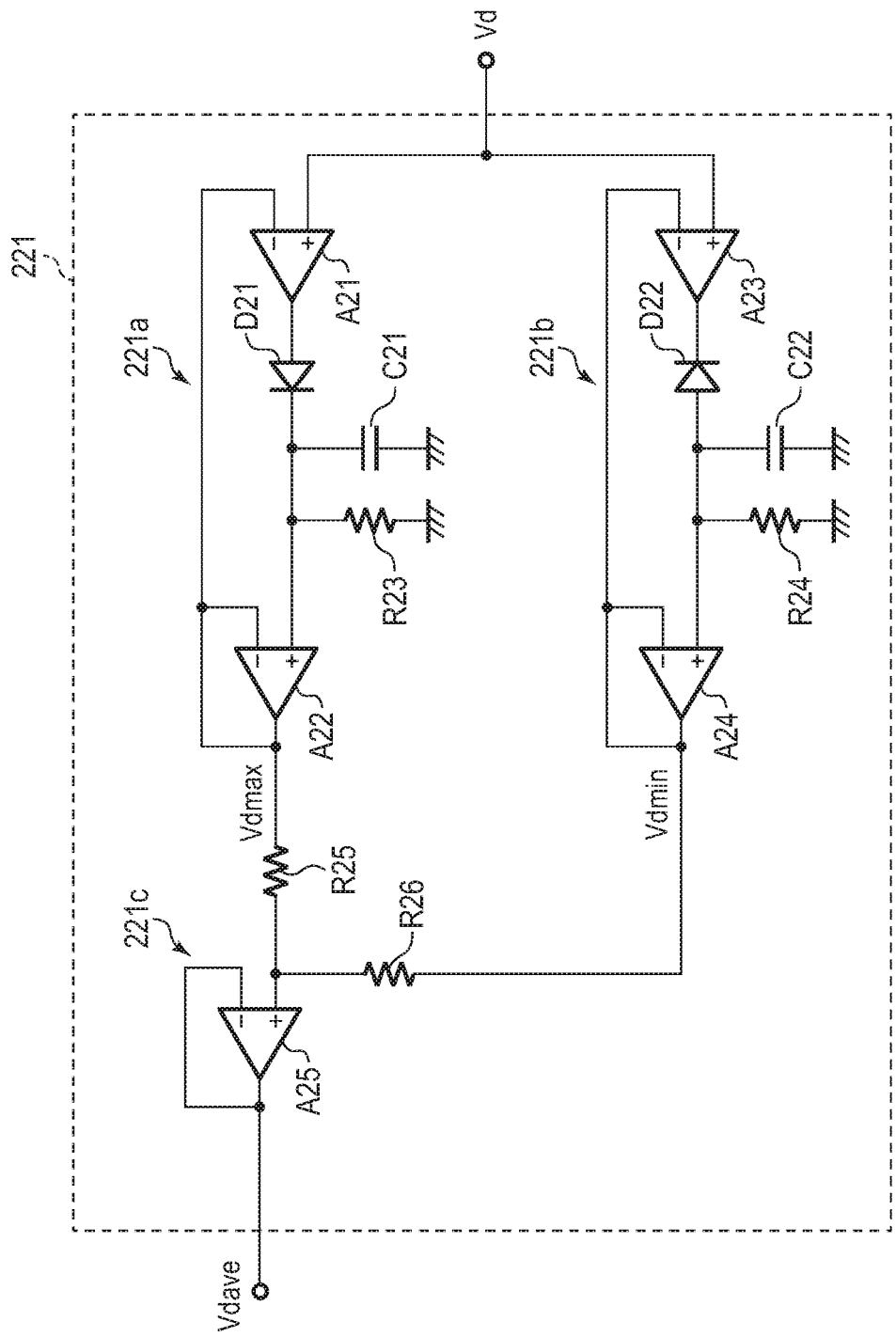
FIG. 6 is a circuit example of an averaging circuit of the first embodiment.

FIG. 6 is a circuit example of the averaging circuit 221 of the present embodiment. The averaging circuit 221 includes a peak-hold circuit 221a, a bottom-hold circuit 221b, and an adder circuit 221c.

The peak-hold circuit 221a includes differential amplifiers A21 and A22, a resistor R23, a capacitor C21, and a diode D21. The detection signal Vd is input to the non-inverting input terminal of the differential amplifier A21. The output terminal of the differential amplifier A21 is connected to the anode of the diode D21, and the cathode of the diode D21 is connected to the capacitor C21, the resistor R23, and the non-inverting input terminal of the differential amplifier A22. The capacitor C21 and the resistor R23 are connected in parallel between the cathode of the diode D21 and the ground voltage. The output terminal of the differential amplifier A22 is connected to the inverting input terminal of the differential amplifier A22 and the inverting terminal of the differential amplifier A21.

In the peak-hold circuit 221a configured as described above, the detection signal Vd is output to the capacitor C21 via the diode D21, and the maximum voltage (peak voltage) Vdmax of the detection signal Vd is held in the capacitor C21. The resistor R23 discharges charges accumulated in the capacitor C21 to the ground voltage at a time constant defined by the resistor R23 and the capacitor C21. In order for the capacitor C21 to hold the maximum voltage Vdmax for a sufficiently long period, a large time constant of the resistor R23 and the capacitor C21 is preferable. On the other hand, an excessively large time constant may reduce the response of the peak-hold circuit 221a. Thus, it is desirable to define the time constant of the resistor R23 and the capacitor C21 also taking the response into consideration. Note that, instead of the resistor R23, a discharging transistor switch may be provided in parallel to the capacitor C21, and charges of the capacitor C21 may be discharged at a desired timing. In the present embodiment, the maximum voltage Vdmax output from the differential amplifier A22 is fed back to the inverting input terminal of the differential amplifier A21. Thus, the maximum voltage Vdmax is not affected by a forward voltage drop in the diode D21, and no level shift occurs in the peak-hold circuit 221a.

The bottom-hold circuit 221b includes differential amplifiers A23 and A24, a resistor R24, a capacitor C22, and a diode D22. Unlike the peak-hold circuit 221a described above, the polarity of the diode D22 is opposite. That is, the output terminal of the differential amplifier A23 is connected to the cathode of the diode D22, the anode of the diode D22 is connected to the capacitor C22 and the resistor R24. The minimum voltage (bottom voltage) Vdmin of the detection signal is held in the capacitor C22. It is preferable that the values of the capacitor C22 and the resistor R24 be the same as the values of the capacitor C21 and the resistor R23 of the peak-hold circuit 221a, respectively. The minimum voltage Vdmin in which a voltage drop of the diode D22 has been cancelled is output from the output terminal of the differential amplifier A24.

The adder circuit 221c includes a differential amplifier A25 and resistors R25 and R26. The non-inverting input terminal of the differential amplifier A25 is connected to the output terminal of the differential amplifier A22 via the resistor R25 and connected to the output terminal of the differential amplifier A24 via the resistor R26. Further, the output terminal of the differential amplifier A25 is connected to the inverting input terminal. The values of the resistors R25 and R26 are the same, and the adder circuit 221c generates the average voltage Vdave of the maximum voltage Vdmax and the minimum voltage Vdmin. In FIG. 5, the average voltage Vdave is applied to the inverting input terminal of the differential amplifier A12 via the resistor R19. The differential amplifier A12 outputs the reference voltage Vref2 in accordance with the correction value Voff that is the difference between the average voltage Vdave and the reference voltage Vref1. With the reference voltage Vref being changed based on the average voltage Vdave, the average voltage Vdave of the detection signal Vd is controlled to be the reference voltage Vref1, that is, the intermediate voltage Vcc/2. In this example, the reference voltage circuit 211 also has the function of the correction circuit 220.

Figure 7:
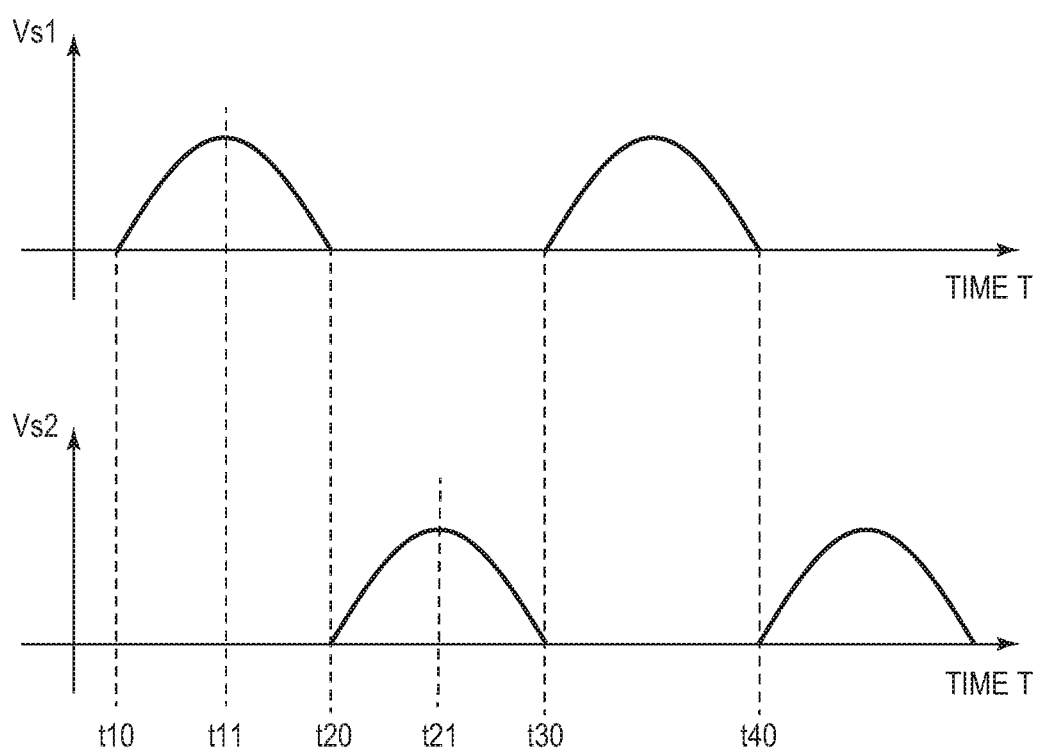
FIG. 7 is a diagram illustrating one example of output signals of photodiodes of the first embodiment.

FIG. 7 is a diagram illustrating one example of output signals of the photodiodes of the present embodiment. The upper graph in FIG. 7 represents a temporal change of the output signal Vs1 of the first photodiode group 10A, and the lower graph in FIG. 7 represents a temporal change of the output signal Vs2 of the second photodiode group 10B. The output signals Vs1 and Vs2 repeat an increase and a decrease with the positive value as time elapses, respectively.

At time t10, as illustrated in FIG. 4, the scale 5 relatively moves with respect to the light receiving unit 1, and the reflected light 7 emitted to the light receiving unit 1 starts moving in the x direction. During time t10 to t20, as the reflected light 7 traverses the first photodiode group 10A, the output signal Vs1 changes. During time t10 to t11, as a portion which is a part of the reflected light 7 and is emitted to the first photodiode group 10A increases, the output signal Vs1 increases. At time t11, when the reflected light 7 and the first photodiode group 10A have the same phase in the x direction, the output signal Vs1 is the maximum. During t11 to t20, as a portion which is a part of the reflected light 7 and is emitted to the first photodiode group 10A decreases, the output signal Vs1 decreases. During time t10 to t20, since the reflected light 7 is not emitted to the second photodiode group 10B, the output signal Vs2 remains at the reference voltage.

During time t20 to t30, as the reflected light 7 traverses the second photodiode group 10B, the output signal Vs2 increases toward the peak voltage. At time t21, when the reflected light 7 and the second photodiode group 10B have the same phase in the x direction, the output signal Vs2 is the maximum. During t21 to t30, as a portion which is a part of the reflected light 7 and is emitted to the second photodiode group 10B decreases, the output signal Vs2 decreases. During time t20 to t30, since the reflected light 7 is not emitted to the first photodiode group 10A, the output signal Vs1 remains at the reference voltage. During time t30 to t40, as the reflected light 7 traverses the first photodiode group 10A, the output signal Vs1 changes. Subsequently, the output signals Vs1 and Vs2 change alternatingly in the same manner.

Figure 8:
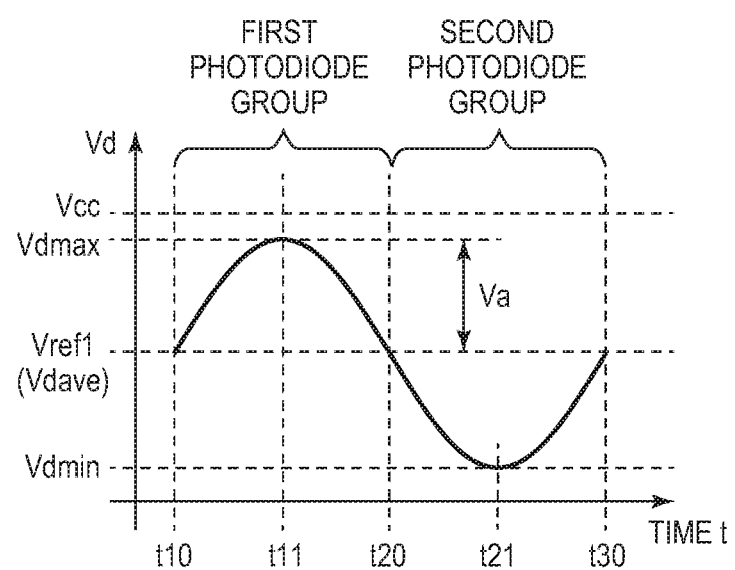
FIG. 8 is a diagram illustrating one example of a detection signal of the first embodiment.

FIG. 8 is a diagram illustrating one example of the detection signal Vd in the present embodiment. The output signals Vs1 and Vs2 illustrated in FIG. 7 are input to the differential amplifier circuit 212. As illustrated in FIG. 5, the differential amplifier circuit 212 operates by using the reference voltage Vref1 as a bias voltage, and the detection signal Vd repeats an increase and a decrease with respect to the reference voltage Vref1. When the reflected light 7 does not enter the photodiode groups 10A and 10B, the detection signal Vd is the reference voltage Vref1.

During time t10 to t20, as the reflected light 7 traverses the first photodiode group 10A, the output signal Vs1 changes with an amplitude Va with respect to the reference voltage Vref1 as a reference. At this time, since the output signal Vs2 of the second photodiode group 10B remains to be the reference voltage Vref1, the detection signal Vd from the differential amplifier circuit 212 changes in accordance with the output signal Vs1. Further, at time t11, the detection signal Vd is the maximum voltage Vdmax.

During time t20 to t30, as the reflected light 7 traverses the second photodiode group 10B, the output signal Vs2 changes with the amplitude Va with respect to the reference voltage Vref1 as a reference. At this time, since the output signal Vs1 of the first photodiode group 10A remains to be the reference voltage Vref1, the detection signal Vd from the differential amplifier circuit 212 changes in accordance with the output signal Vs2. Further, at time t21, the detection signal Vd is the minimum voltage Vdmin.

As illustrated in FIG. 8, the reference voltage Vref1 is set to half the voltage between the power source voltage Vcc and the ground voltage. Further, as described in FIG. 4, the number of photodiodes forming the first photodiode group 10A and the number of photodiodes forming the second photodiode group 10B are the same. Thus, the waveforms of the output signals Vs1 and Vs2 are symmetrical to each other, and the detection signal Vd may have a wide dynamic range. The average voltage Vdave of the detection signal Vd becomes the same as the reference voltage Vref1, and the corrected reference voltage Vref2 is the same as the reference voltage to be corrected Vref1.

Figure 9:
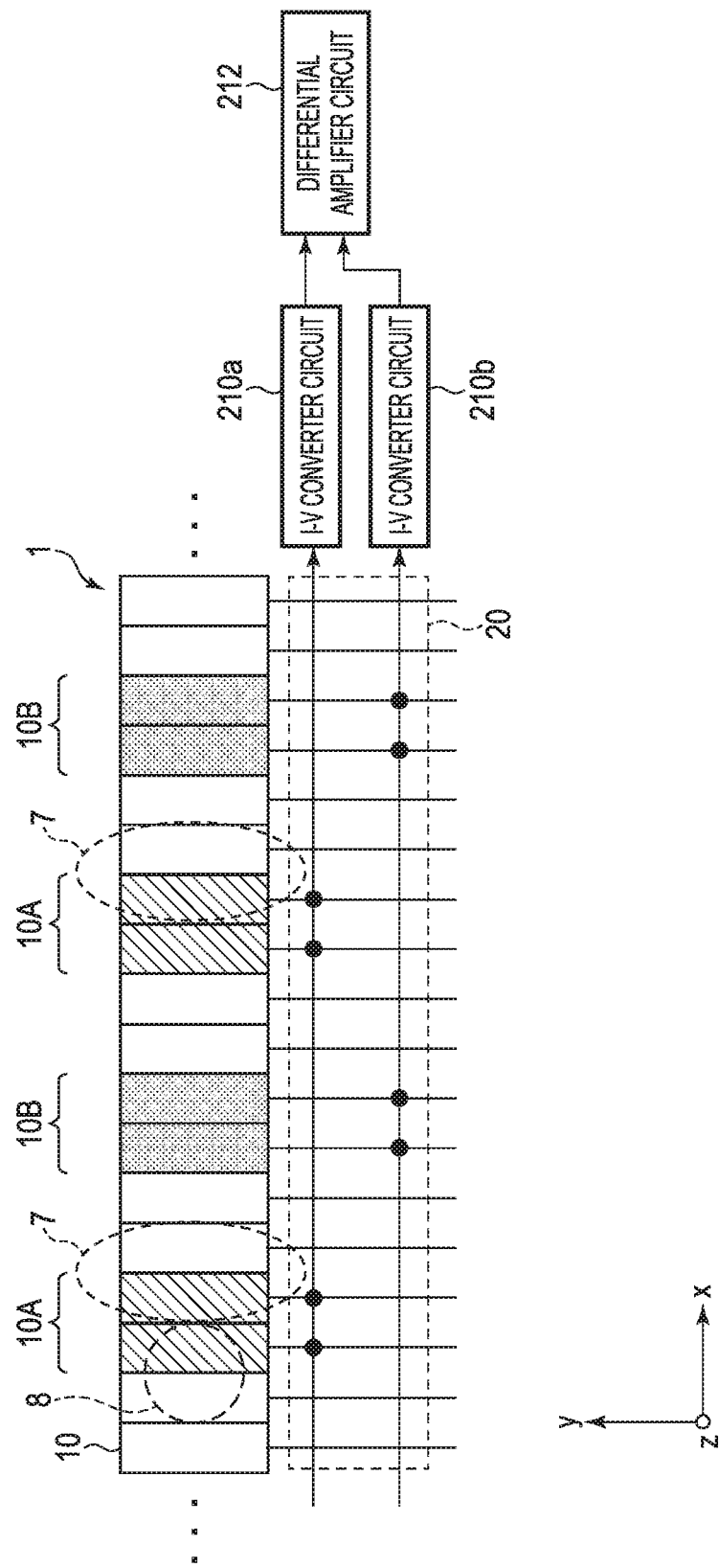
FIG. 9 is a diagram illustrating an operation of the photodetector device of the first embodiment.
Figure 10:
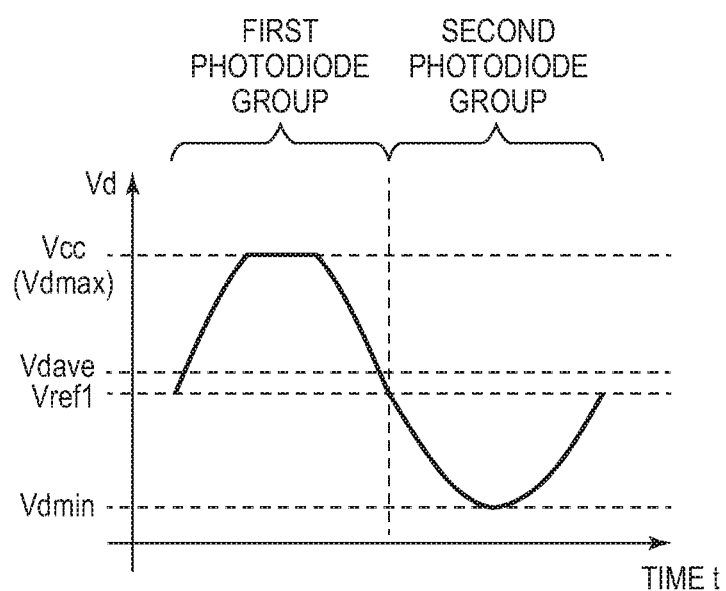
FIG. 10 is a diagram illustrating an operation of the photodetector device of the first embodiment.

FIG. 9 and FIG. 10 are diagrams illustrating the operation of the photodetector device of the present embodiment. FIG. 9 represents a state where the light receiving unit 1 is irradiated with the stray light 8, and FIG. 10 represents the detection signal Vd when irradiated with the stray light 8.

As described above, the light receiving unit 1 may be irradiated with the stray light 8 in addition to the reflected light 7 in the scale 5. The stray light 8 is a reflected light from a member such as a housing, a package, or the like or a disturbance light and is not necessarily emitted evenly to the photodiode groups 10A and 10B as with the reflected light 7. For example, as illustrated in FIG. 9, when the stray light 8 enters only the first photodiode group 10A, the output signal Vs1 of the first photodiode group 10A is larger than the output signal Vs2 of the second photodiode group 10B, and the output signal Vs1 and the output signal Vs2 are no longer symmetrical. For example, as illustrated in FIG. 10, in the detection signal Vd, the voltage of a signal portion corresponding to the output signal Vs1 increases, and saturation occurs at the power source voltage Vcc. When the optical encoder performs position detection by using such a detection signal Vd, it will be difficult to accurately detect the phase in particular in the saturated signal portion. Further, in the detection signal Vd, when the symmetry between a signal portion corresponding to the output signal Vs1 and a signal portion corresponding to the output signal Vs2 is impaired, position detection accuracy may deteriorate. The photodetector device of the present embodiment outputs a stable detection signal Vd by feeding back the average voltage Vdave of the detection signal Vd to the reference voltage circuit 211. The operation of the photodetector device of the present embodiment will be described below in detail.

In FIG. 10, the maximum voltage Vdmax of the detection signal Vd is affected by the stray light 8, and the maximum voltage Vdmax is saturated at the power source voltage Vcc. On the other hand, since the minimum voltage Vdmin of the detection signal Vd is not affected by the stray light 8, there is a sufficient margin to the ground voltage. In such a case, the average voltage Vdave of the maximum voltage Vdmax and the minimum voltage Vdmin is higher than the power source voltage Vcc/2, that is, the reference voltage Vref1. The reference voltage circuit 211 generates the corrected reference voltage Vref2 based on the correction value Voff that is the difference between the average voltage Vdave and the reference voltage Vref1. The reference voltage Vref2 is represented by a voltage obtained by subtracting the correction value Voff from the reference voltage Vref1 as expressed by Equation (4). In the example of FIG. 10, the corrected reference voltage Vref2 is lower than the reference voltage Vref1. The differential amplifier circuit 212 outputs the detection signal Vd by using the reduced reference voltage Vref2 as a bias voltage, and the signal waveform of the detection signal Vd is shifted to the lower voltage side. Thus, the maximum voltage Vdmax also becomes lower and is less likely to be saturated at the power source voltage Vcc. Furthermore, the average voltage Vdave gradually approaches the reference voltage Vref1, and the voltage amplitudes of the maximum voltage Vdmax and the minimum voltage Vdmin are symmetrical with respect to the reference voltage Vref1.

Even when the stray light 8 enters the second photodiode group 10B, an advantageous effect of the present embodiment is obtained in the same manner. In such a case, the minimum voltage Vdmin decreases and may be clipped at the ground voltage. The average voltage Vdave decreases in contrast to the case of FIG. 10, and the corrected reference voltage Vref2 is higher than the reference voltage Vref1. The voltage level of the detection signal Vd output from the differential amplifier circuit 212 is shifted to the power source voltage side, and the average voltage Vdave approaches the reference voltage Vref1. The voltage amplitudes of the maximum voltage Vdmax and the minimum voltage Vdmin are symmetrical with respect to the reference voltage Vref1. Further, because the signal waveform of the detection signal Vd is shifted to the power source voltage side, saturation of the minimum voltage Vdmin at the ground voltage is eliminated or reduced.

As described above, according to the present embodiment, when the stray light 8 enters the light receiving unit 1, it is possible to output a stable detection signal by controlling the bias voltage of the detection signal Vd. Further, it is possible to perform more accurate position detection by applying the photodetector device of the present embodiment to the optical encoder.

In particular, when a photodetector device is used for an optical encoder and a light source and a light receiving unit are arranged in the same package, a stray light is likely to occur inside the package. The photodetector device of the present embodiment is particularly useful when arranged inside a package together with a light source.

Further, in the photodetector device of the present embodiment, the light receiving unit 1, the signal processing unit 2, and the light source 3 are provided in the common substrate 4. In such a way, the light receiving unit 1, the signal processing unit 2, and the light source 3 are formed in the same package, and thereby the relative position of the light receiving unit 1 and the light source 3 can be defined at high accuracy, and accurate position detection is enabled.

Note that, although the photodetector device of the present embodiment controls the bias voltage of the detection signal Vd by correcting the reference voltage Vref of the differential amplifier circuit 212, a signal or a circuit targeted for correction is not limited to the example described above. For example, the gain or the offset voltage of the I-V converter circuit 210a or 210b may be corrected. That is, it is also possible to improve symmetry of the output signals Vs1 and Vs2 input to the differential amplifier circuit 212 by correcting and reducing the gain or the offset voltage of one of the output signals Vs1 and Vs2 which is affected by the stray light 8.

Second Embodiment

Figure 11:
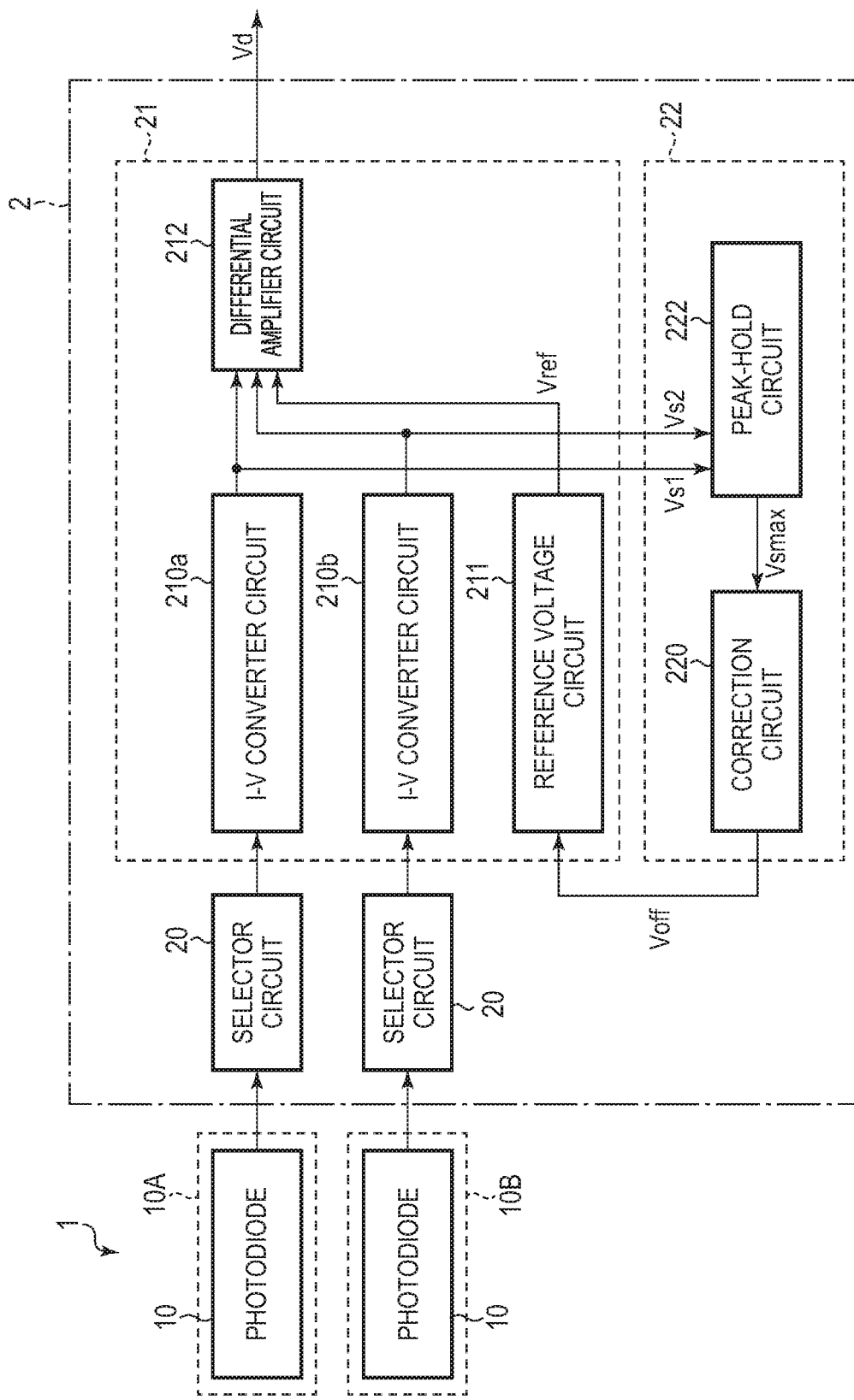
FIG. 11 is a block diagram of a light receiving unit and a signal processing unit of a second embodiment.

Next, a photodetector device of the present embodiment will be described mainly for the configuration different from the first embodiment. FIG. 11 is a block diagram of a light receiving unit and a signal processing unit of the present embodiment. The signal processing unit 2 includes the selector circuits 20, the detection signal generation unit 21, and the correction unit 22.

The first photodiode group 10A, the second photodiode group 10B, the selector circuit 20, and the detection signal generation unit 21 are configured in substantially the same manner as in the first embodiment. The detection signal generation unit 21 includes the I-V converter circuits 210a and 210b, the reference voltage circuit 211, and the differential amplifier circuit 212. The I-V converter circuit 210a converts a current of the photodiodes 10 of the first photodiode group 10A into a voltage to generate the output signal Vs1. Similarly, the I-V converter circuit 210b converts a current of the photodiodes 10 of the second photodiode group 10B into a voltage to generate the output signal Vs2.

The correction unit 22 includes the correction circuit 220 and a peak-hold circuit 222. In the present embodiment, the peak-hold circuit 222 is provided instead of the averaging circuit 221 of the first embodiment. The peak-hold circuit 222 detects the maximum voltages Vsmax1 and Vsmax2 of respective output signals Vs1 and Vs2. The correction circuit 220 includes a differential amplifier circuit and generates the correction value Voff based on the difference between the maximum voltage Vsmax1 and Vsmax2. The correction value Voff is expressed by the following equation, where the gain of the correction circuit 220 is denoted as "A".

$$Voff = A \times (Vsmax1 - Vsmax2)/2 \quad \text{(Equation 5)}$$

The correction value Voff is fed back to the reference voltage circuit 211. The corrected reference voltage Vref2 is expressed by the following equation, where a reference voltage to be corrected is denoted as "Vref1" and the corrected reference voltage is denoted as "Vref2".

$$Vref2 = Vref1 - Voff \quad \text{(Equation 6)}$$

The reference voltage circuit 211 corrects the detection signal Vd by changing the reference voltage Vref based on the correction value Voff.

Figure 12:
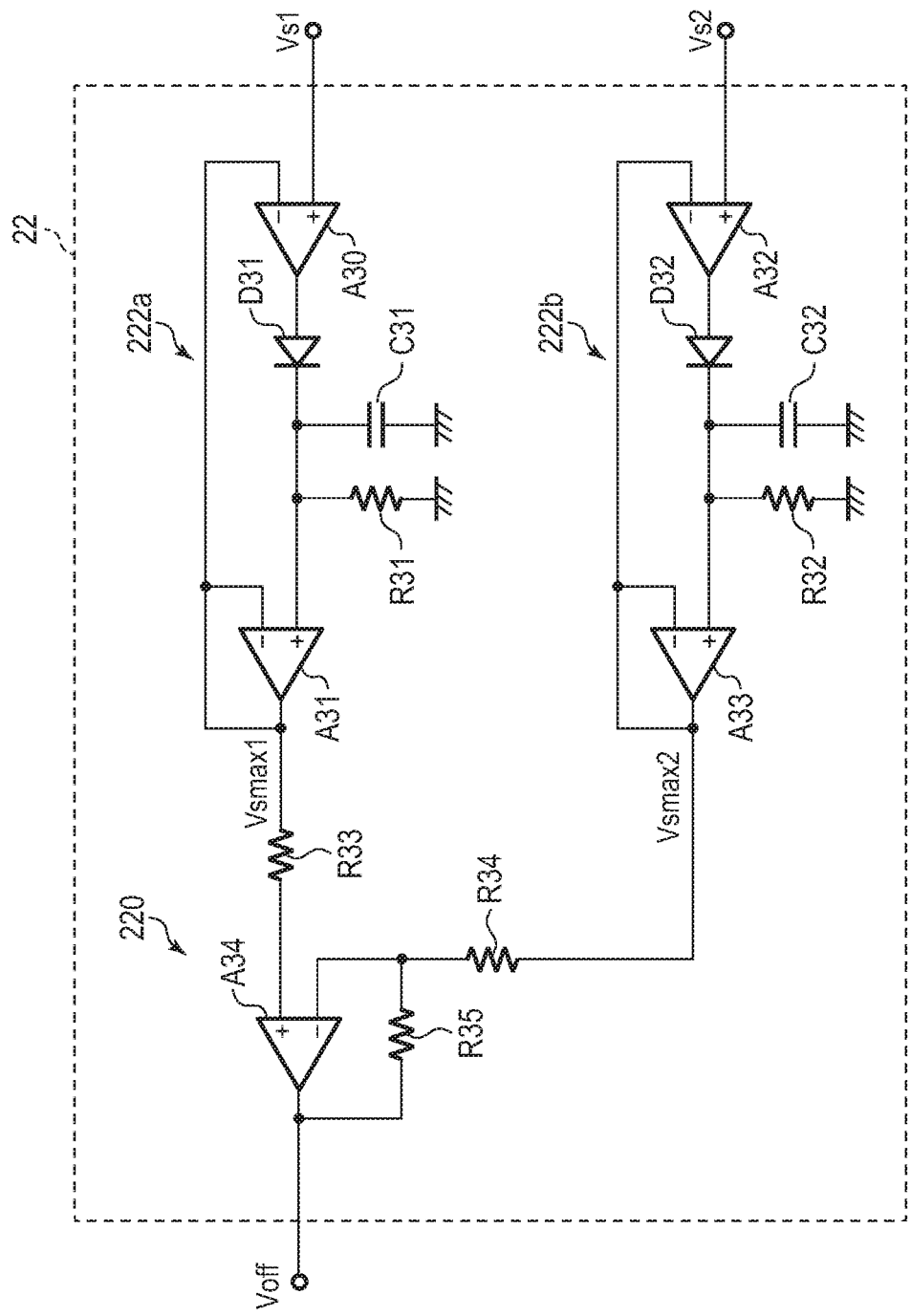
FIG. 12 is a circuit example of a correction unit of the second embodiment.

FIG. 12 is a circuit example of the correction unit 22 of the present embodiment. The correction unit 22 includes peak-hold circuits 222a and 222b and the correction circuit 220. Note that, although the output signals Vs1 and Vs2 in the detection signal generation unit 21 of FIG. 5 have a voltage change inversed from the photocurrent change of the photodiodes 10, it is assumed in the following description that the output signals Vs1 and Vs2 have a positive amplitude in the same manner as the photocurrent change.

The peak-hold circuit 222a includes differential amplifiers A30 and A31, a resistor R31, a capacitor C31, and a diode D31. The output signal Vs1 of the first photodiode group 10A is input to the non-inverting input terminal of the differential amplifier A30. The output terminal of the differential amplifier A30 is connected to the anode of the diode D31, and the cathode of the diode D31 is connected to the non-inverting input terminal of the capacitor C31, the resistor R31, and the differential amplifier A31. The capacitor C31 and the resistor R31 are connected in parallel between the cathode of the diode D31 and the ground voltage. The output terminal of the differential amplifier A31 is connected to the inverting input terminal of the differential amplifier A30 and the inverting input terminal of the differential amplifier A31.

In the peak-hold circuit 222a configured as described above, the output signal Vs1 is output to the capacitor C31 via the diode D31, and the maximum voltage Vsmax1 of the output signal Vs1 is held in the capacitor C31. The resistor R31 discharges charges accumulated in the capacitor C31 to the ground voltage at a time constant defined by the resistor R31 and the capacitor C31. It is desirable that the time constant of the resistor R31 and the capacitor C31 be longer than a period of one cycle of the output signal Vs1. Note that, instead of the resistor R31, a discharging transistor switch may be provided in parallel to the capacitor C31.

Similarly, the peak-hold circuit 222b includes differential amplifiers A32 and A33, a resistor R32, a capacitor C32, and a diode D32 and outputs the maximum voltage Vsmax2 of the output signal Vs2.

The correction circuit 220 includes a differential amplifier A34 and resistors R33, R34, and R35. The maximum voltage Vsmax1 is input to the non-inverting input terminal of the differential amplifier A34 via the resistor R33, and the maximum voltage Vsmax2 is input to the inverting input terminal via the resistor R34. The resistor R35 is connected to the output terminal and the inverting input terminal of the differential amplifier A34. The differential amplifier A34 outputs the correction value Voff in accordance with the difference between the maximum voltages Vsmax1 and Vsmax2.

The correction value Voff is input to the reference voltage circuit 211. In FIG. 5, the correction value Voff is applied to the inverting input terminal of the differential amplifier A12 via the resistor R19. The differential amplifier A12 outputs the reference voltage Vref2 in accordance with the correction value Voff, and the differential amplifier circuit 212 generates the detection signal Vd by using the corrected reference voltage Vref2.

Also in the present embodiment, an advantageous effect can be obtained in the same manner as the first embodiment. That is, when the stray light 8 enters the light receiving unit 1, it is possible to output a stable detection signal Vd by controlling the bias voltage of the detection signal Vd. Further, it is possible to perform more accurate position detection by applying the photodetector device of the present embodiment to the optical encoder.

In the photodetector device of the present embodiment, the light receiving unit 1, the signal processing unit 2, and the light source 3 are provided in the common substrate 4. In such a way, the light receiving unit 1, the signal processing unit 2, and the light source 3 are formed in the same package, and thereby the relative position of the light receiving unit 1 and the light source 3 can be defined at high accuracy, and accurate position detection is enabled.

The correction unit 22 of the present embodiment generates the correction value Voff by using the output signals Vs1 and Vs2 obtained before input to the differential amplifier circuit 212. Thus, when the detection signal Vd is saturated, it is possible to reduce the time required for correction compared to the first embodiment in which the correction value Voff is generated by using the detection signal Vd output from the differential amplifier circuit 212.

Third Embodiment

Next, a photodetector device of the present embodiment will be described.

Figure 13:
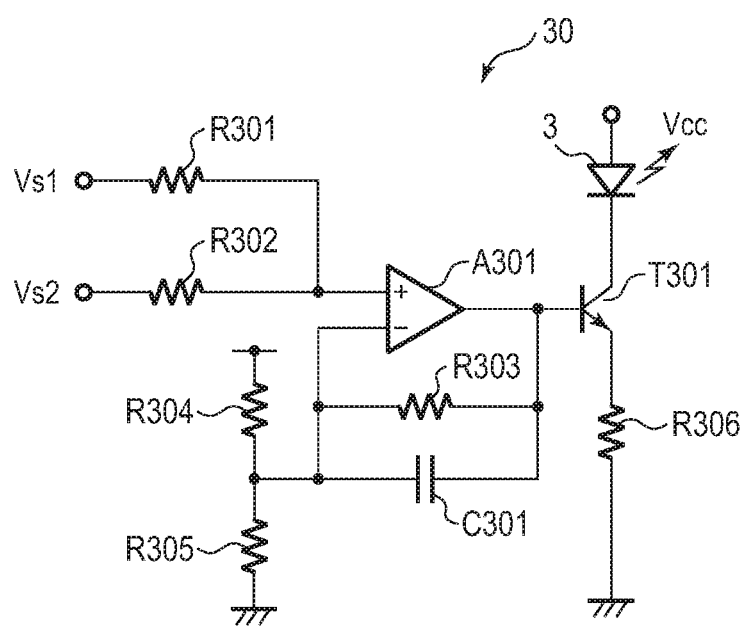
FIG. 13 is a diagram of a light source control circuit of a third embodiment.

The photodetector device of the present embodiment can correct the light amount of the light source 3 in addition to correction of the detection signal Vd. FIG. 13 is a diagram of a light source control circuit of the present embodiment. A light source control circuit 30 includes a differential amplifier A301, a transistor T301, a capacitor C301, resistors R301, R302, R303, R304, R305, and R306 and can control the light amount of the light source 3.

To the non-inverting input terminal of the differential amplifier A301, the output signal Vs1 of the first photodiode group 10A is input via the resistor R301, and the output signal Vs2 of the second photodiode group 10B is input via the resistor R302. Further, a reference voltage obtained by dividing a voltage by the resistors R304 and R305 is input to the inverting input terminal of the differential amplifier A301. The resistor R303 and the capacitor C301 are connected in parallel between the output terminal and the inverting input terminal of the differential amplifier A301. The output terminal of the differential amplifier A301 is connected to the base of the transistor T301, and the emitter of the transistor T301 is grounded via the resistor R306. The light source 3 is connected between the corrector of the transistor and the power source voltage.

The differential amplifier A301 integrates the addition value of the output signals Vs1 and Vs2 at a time constant of the resistor R303 and the capacitor C301 to change the base voltage of the transistor T301. The transistor T301 conducts a current in accordance with the base voltage to the light source 3 to control the light amount of the light source 3. When the output signals Vs1 and Vs2 are inverted with respect to the detection light amount, the base voltage decreases and the light amount of the light source 3 is reduced as the amplitude of the output signals Vs1 and Vs2 increases. For example, as illustrated in FIG. 10, when the detection signal Vd is saturated, the light amount of the light source 3 is reduced. The intensity of the reflected light 7 from the scale 5 decreases, and the amplitude of the detection signal Vd also decreases. Thus, saturation of the detection signal Vd is eliminated or reduced, a stable detection signal Vd can be output. By correcting the light amount of the light source 3 in addition to the correction of the detection signal Vd in the first and second embodiments, it is possible to effectively improve the dynamic range of the detection signal Vd.

Note that the light amount of the light source 3 may be changed gradually from a smaller value to a larger value, and the light amount obtained immediately before the detection signal Vd is saturated may be maintained. Thereby, it is possible to maximize the dynamic range while avoiding saturation of the detection signal Vd. Herein, whether or not the detection signal Vd is saturated may be determined by the voltage difference between the average voltage Vdave and the reference voltage Vref1. For example, when either the maximum voltage Vdmax or the minimum voltage Vdmin is saturated, the average voltage Vdave is shifted away from the reference voltage Vref1. Accordingly, the photodetector device can detect saturation of the detection signal Vd by monitoring the average voltage Vdave.

Therefore, according to the present embodiment, by controlling the light amount of a light source in addition to correction of a bias voltage of a detection signal, it is possible to more effectively generate a stable detection signal.

Other Embodiments

The photodetector devices of the disclosed embodiments are applicable to various apparatuses and devices. The photodetector device is preferably applicable to an optical encoder device in particular, and the optical encoder device may be of any type such as a linear encoder, a rotary encoder, or the like. Furthermore, the optical encoder device is applicable to the device having a movable mechanism, such as an optical lens of an imaging device, an electrophotographic device, a transport device, or the like.

While the average voltage Vdave is generated based on the maximum voltage Vdmax and the minimum voltage Vdmin of the detection signal Vd in the first embodiment, an integration circuit including a resistor element and a capacitor element may be used to generate the average voltage Vdave of the detection signal Vd. Further, the average voltage Vdave may be generated by sampling the detection signal Vd for a predetermined period and a predetermined number of times and dividing the integrated detection signal Vd by the number of sampling times. Furthermore, the detection signal Vd, the average voltage Vdave, and the correction value Voff may be calculated by calculating digital data after analog-to-digital conversion of the output signals Vs1 and Vs2.

Further, the photodetector device and the optical encoder device of the embodiments described above may be a semiconductor device formed on the semiconductor substrate. That is, an element such as a photodiode, a transistor, a resistor, a capacitor, or the like is formed on a semiconductor wafer, and a photodetector device may be formed as a semiconductor device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-045068, filed Mar. 12, 2019, which is hereby incorporated by reference herein in its entirety.

What is claimed is:

1. A photodetector device comprising:
   a light receiving unit including a plurality of photoelectric conversion elements;
   a selector circuit that selects a first photoelectric conversion element group and a second photoelectric conversion element group, in the light receiving unit;
   a differential amplifier that outputs a detection signal in accordance with a difference between a first output signal of the first photoelectric conversion element group and a second output signal of the second photoelectric conversion element group; and
   a correction unit that corrects the detection signal based on the first output signal and the second output signal,
   wherein an output from the correction unit is input to the differential amplifier.

2. The photodetector device according to claim 1, wherein the correction unit corrects the detection signal based on the difference between the first output signal and the second output signal.

3. The photodetector device according to claim 1, wherein the correction unit corrects the detection signal by using the detection signal in accordance with the difference.

4. The photodetector device according to claim 3, wherein the correction unit corrects the detection signal by using an average voltage of the detection signal.

5. The photodetector device according to claim 4, wherein the correction unit calculates the average voltage by integrating the detection signal for a predetermined period.

6. The photodetector device according to claim 1, wherein the correction unit includes a peak-hold circuit that detects a first maximum voltage of the first output signal and a second maximum voltage of the second output signal obtained before being input to the differential amplifier and generates a correction value based on a difference between the first maximum voltage and the second maximum voltage.

7. The photodetector device according to claim 6 further comprising a reference voltage circuit that supplies to a bias voltage to the differential amplifier,
   wherein the reference voltage circuit changes the bias voltage based on the correction value.

8. The photodetector device according to claim 7,
   wherein the differential amplifier includes a first input terminal to which the first output signal is input and a second input terminal to which the second output signal is input, and
   wherein the reference voltage circuit supplies the bias voltage to either the first input terminal or the second input terminal.

9. The photodetector device according to claim 7,
   wherein the differential amplifier is driven by a first power source voltage and a second power source voltage, and
   wherein the reference voltage circuit changes the bias voltage with reference to an intermediate voltage of the first power source voltage and the second power source voltage as a reference.

10. The photodetector device according to claim 1, wherein the first photoelectric conversion element group and the second photoelectric conversion element group include the same number of photoelectric conversion elements, respectively.

11. The photodetector device according to claim 1, wherein the plurality of photoelectric conversion elements are arranged so as to receive a reflected light from a scale including a predetermined pattern.

12. The photodetector device according to claim 11 further comprising a light source that emits a light to the scale, wherein the light source, the light receiving unit, the selector circuit, the differential amplifier, and the correction unit are provided in the same package.

13. The photodetector device according to claim 11 further comprising:
   a light source that emits a light to the scale; and
   a light source control circuit configured to control a light amount of the light source based on the first output signal and the second output signal.

14. A photodetector device comprising:
   a light receiving unit including a plurality of photoelectric conversion elements;
   a selector circuit that selects a first photoelectric conversion element group and a second photoelectric conversion element group, in the light receiving unit;
   a differential amplifier that outputs a detection signal in accordance with a difference between a first output signal of the first photoelectric conversion element group and a second output signal of the second photoelectric conversion element group; and
   a correction unit that corrects the detection signal based on the first output signal and the second output signal, wherein the correction unit corrects the detection signal by using an average voltage of the detection signal, and wherein the correction unit calculates the average voltage from a maximum voltage and a minimum voltage of the detection signal.

15. The photodetector device according to claim 14, wherein the maximum voltage is a voltage of a signal portion corresponding to the first output signal in the detection signal, and wherein the minimum voltage is a voltage of a signal portion corresponding to the second output signal in the detection signal.

16. The photodetector device according to claim 14, wherein the correction unit includes a peak-hold circuit that detects the maximum voltage of the detection signal and a bottom-hold circuit that detects the minimum voltage of the detection signal and generates a correction value based on the average voltage by adding the maximum voltage and the minimum value.

17. An optical encoder device comprising:

a light receiving unit including a plurality of photoelectric conversion elements;

a selector circuit that selects a first photoelectric conversion element group and a second photoelectric conversion element group, in the light receiving unit;

a differential amplifier that outputs a detection signal in accordance with a difference between a first output signal of the first photoelectric conversion element group and a second output signal of the second photoelectric conversion element group; and a correction unit that corrects the detection signal based on the first output signal and the second output signal, wherein an output from the correction unit is input to the differential amplifier, wherein the plurality of photoelectric conversion elements are arranged so as to receive a reflected light from a scale including a predetermined pattern, and wherein the optical encoder device is configured to detect a change in a relative position between the scale and the light receiving unit.

\* \* \* \* \*